(12) United States Patent
Chen et al.

(10) Patent No.: US 11,175,059 B2
(45) Date of Patent: Nov. 16, 2021

(54) AIR CONDITIONING SYSTEM AND METHOD OF OPERATING THE SAME

(71) Applicant: DELTA ELECTRONICS, INC., Taoyuan (TW)

(72) Inventors: Lee-Lung Chen, Taoyuan (TW);
Yen-Chang Chen, Taoyuan (TW);
Chia-Wei Chen, Taoyuan (TW);
Jian-Jhang Wu, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 227 days.

(21) Appl. No.: 16/211,894

(22) Filed: Dec. 6, 2018

(65) Prior Publication Data
US 2019/0242606 A1 Aug. 8, 2019

(30) Foreign Application Priority Data
Feb. 7, 2018 (CN) .......................... 201810123974.7

(51) Int. Cl.
*F24F 11/46* (2018.01)
*F24F 11/74* (2018.01)
(Continued)

(52) U.S. Cl.
CPC .............. *F24F 11/46* (2018.01); *F24F 11/74* (2018.01); *F24F 11/81* (2018.01); *F24F 11/86* (2018.01);
(Continued)

(58) Field of Classification Search
CPC .. F24F 11/46; F24F 11/74; F24F 11/81; F24F 11/86; F24F 2110/10; F24F 2140/50;
(Continued)

(56) References Cited

U.S. PATENT DOCUMENTS

| 4,813,474 A | * | 3/1989 | Umezu | ..................... F24F 11/30 165/228 |
| 5,263,335 A | * | 11/1993 | Isono | ..................... F25B 49/025 62/228.4 |

(Continued)

FOREIGN PATENT DOCUMENTS

| CN | 1414324 A | 4/2003 |
| CN | 1769803 A | 5/2006 |

(Continued)

OTHER PUBLICATIONS

Office Action issued in corresponding CN patent application No. 201810123974.7 dated Jul. 21, 2020.

*Primary Examiner* — Emmanuel E Duke
(74) *Attorney, Agent, or Firm* — Muncy, Geissler, Olds and Lowe, P.C.

(57) ABSTRACT

An air conditioning system includes a control unit, a circulation system, an AC-to-DC conversion unit, and a fan module. The control unit detects an area temperature, controls the compressor unit being in operation or not in operation according to the area temperature and a setting temperature set by the control unit, and control a rotation speed of the condensing fan according to a temperature difference between the area temperature and the setting temperature. When the area temperature is greater than the setting temperature, the control unit controls the compressor unit being in operation and control the condensing fan being in full-speed operation.

12 Claims, 8 Drawing Sheets

(51) Int. Cl.
*F24F 11/81* (2018.01)
*F24F 11/86* (2018.01)
*F25B 5/02* (2006.01)
*F25B 6/02* (2006.01)
*F25B 49/02* (2006.01)
*F25B 41/31* (2021.01)
*F24F 110/10* (2018.01)
*F24F 140/50* (2018.01)
*F24F 140/60* (2018.01)

(52) U.S. Cl.
CPC ............... *F25B 5/02* (2013.01); *F25B 6/02* (2013.01); *F25B 41/31* (2021.01); *F25B 49/02* (2013.01); *F24F 2110/10* (2018.01); *F24F 2140/50* (2018.01); *F24F 2140/60* (2018.01); *F25B 2313/0293* (2013.01); *F25B 2400/06* (2013.01); *F25B 2400/0751* (2013.01); *F25B 2500/05* (2013.01); *F25B 2600/0251* (2013.01); *F25B 2600/111* (2013.01); *F25B 2600/112* (2013.01); *F25B 2700/2104* (2013.01)

(58) Field of Classification Search
CPC ....... F24F 2140/60; F24F 11/88; F25B 49/02; F25B 5/02; F25B 6/02; F25B 41/062; F25B 2700/2104; F25B 2600/111; F25B 2600/0251; F25B 2600/112; F25B 2400/06; F25B 2500/05; F25B 2313/0293; F25B 2400/0751; Y02B 30/70
See application file for complete search history.

(56) References Cited

U.S. PATENT DOCUMENTS

| | | | | |
|---|---|---|---|---|
| 2001/0054293 | A1* | 12/2001 | Gustafson | F25B 49/02 62/183 |
| 2006/0272343 | A1* | 12/2006 | Takahashi | B60H 1/3208 62/230 |
| 2009/0277197 | A1* | 11/2009 | Gambiana | F25B 39/028 62/115 |
| 2010/0180630 | A1* | 7/2010 | Ogawa | F25B 41/04 62/498 |
| 2011/0016893 | A1* | 1/2011 | Dawes | F25B 49/02 62/89 |
| 2012/0210736 | A1* | 8/2012 | Rockenfeller | F25B 49/02 62/115 |
| 2013/0104584 | A1* | 5/2013 | Takizawa | F25B 49/022 62/228.1 |
| 2013/0205807 | A1* | 8/2013 | Mcshane | F25B 49/02 62/56 |
| 2015/0007599 | A1* | 1/2015 | Sugiyama | F25B 49/027 62/186 |
| 2015/0180324 | A1* | 6/2015 | Hsu | H02M 7/06 363/89 |
| 2015/0204594 | A1* | 7/2015 | Luo | F25B 13/00 62/115 |
| 2015/0345848 | A1* | 12/2015 | Him | F25B 49/022 62/84 |
| 2016/0061504 | A1* | 3/2016 | Penn, II | F25B 47/025 62/80 |
| 2016/0131376 | A1* | 5/2016 | Yoon | F24F 11/83 62/86 |
| 2017/0254569 | A1* | 9/2017 | Kuroda | F25B 1/10 |
| 2018/0209683 | A1* | 7/2018 | Cho | F24F 11/76 |
| 2018/0287409 | A1* | 10/2018 | Cheng | H02J 7/0068 |

FOREIGN PATENT DOCUMENTS

| | | | | |
|---|---|---|---|---|
| CN | 103032938 | A | | 4/2013 |
| CN | 203442995 | U | | 2/2014 |
| CN | 103032938 | B | * | 4/2015 |
| CN | 105841296 | A | | 8/2016 |
| CN | 106440027 | A | * | 2/2017 |
| CN | 107187292 | A | | 9/2017 |
| JP | 2012172913 | A | * | 9/2012 ................ F24F 1/20 |

* cited by examiner

AIR CONDITIONING SYSTEM AND METHOD OF OPERATING THE SAME

BACKGROUND

Technical Field

The present disclosure relates to an air conditioning system and a method of operating the same, and more particularly to an air conditioning system and a method of operating the same capable of controlling a rotation speed of a condensing fan which are applied to an invariable frequency compressor.

Description of Related Art

The statements in this section merely provide background information related to the present disclosure and do not necessarily constitute prior art.

In the conventional invariable-frequency air conditioning system, the AC power source is provided to the controller, and then the controller controls a single compressor being in operation and controls an AC condensing fan and an AC evaporating fan being in operation. Since only one single compressor is operated and the rotation speed of the AC condensing fan and the AC evaporating fan fail to be controlled by the controller, an area temperature, which is controlled by the conventional invariable-frequency air conditioning system, is significantly changed so that the area temperature fails to be accurately and stably controlled. Moreover, the compressor needs to be frequently turned on and turned off by the controller in order to maintain the area temperature within a predetermined temperature range, thereby shortening the operation life of the compressor.

In addition, since the awareness of environmental protection has risen in recent years, the variable-frequency air conditioning system is commonly used for the accurate temperature control of the area temperature, the turned-on and turned-off reduction of the compressor, and the electricity saving. However, it is more complicated to control the variable-frequency air conditioning system. Moreover, the variable-frequency compressor is more expensive in order to achieve the variable-frequency control, thereby increasing the overall costs of the air conditioning system.

SUMMARY

In order to solve the problem above, an air conditioning system is provided. The air conditioning system includes a control unit, a circulation system, an AC-to-DC conversion unit, and a fan module. The control unit is coupled to an AC power source. The circulation system includes a compressor unit, and the compressor unit includes a first compressor and a second compressor. The first compressor and the second compressor are coupled to the control unit. The AC-to-DC conversion unit converts the AC power source into a DC power source. The fan module includes a condensing fan, and the condensing fan is coupled to the control unit and the AC-to-DC conversion unit and the condensing fan receives the DC power source. The control unit detects an area temperature, controls the compressor unit being in operation or not in operation according to the area temperature and a setting temperature set by the control unit, and controls a rotation speed of the condensing fan according to a temperature difference between the area temperature and the setting temperature. When the area temperature is greater than the setting temperature, the control unit controls the compressor unit being in operation and controls the condensing fan being in full-speed operation.

In one or more than one embodiment, when the area temperature is decreased to close to an approach temperature of the setting temperature, the control unit controls the first compressor being in operation, controls the second compressor being not in operation, and controls the condensing fan being in full-speed operation.

In one or more than one embodiment, when the area temperature is gradually decreased from the approach temperature to the setting temperature, the control unit controls the first compressor being in operation, controls the second compressor being not in operation, and controls to gradually slow down the rotation speed of the condensing fan. When the area temperature is gradually increased to the approach temperature, the control unit controls the first compressor being not in operation, controls the second compressor being in operation, and controls to gradually speed up the rotation speed of the condensing fan.

In one or more than one embodiment, when the area temperature is less than or equal to the setting temperature, the control unit controls the compressor unit being not in operation and controls the condensing fan being not in operation.

In one or more than one embodiment, the air conditioning system further includes a first circulation module and a second circulation module. The first circulation module is coupled to the first compressor, and the first circulation module includes a first pressure regulator, a first condenser, and a first evaporator. The second circulation module is coupled to the second compressor, and the second circulation module includes a second pressure regulator, a second condenser, and a second evaporator. The first condenser is coupled to the first compressor and one side of the first pressure regulator. The first evaporator is coupled to the first compressor and the other side of the first pressure regulator. The second condenser is coupled to the second compressor and one side of the second pressure regulator. The second evaporator is coupled to the second compressor and the other side of the second pressure regulator. The fan module further includes an evaporating fan. The condensing fan is disposed at the same side of the first condenser and the second condenser, and the evaporating fan is disposed at the same side of the first evaporator and the second evaporator.

In one or more than one embodiment, the control unit controls the first compressor and the second compressor being in operation or being not in operation according to the area temperature so as to control the first circulation module and the second circulation module to operate or not to operate a refrigerant circulation.

In one or more than one embodiment, the condensing fan adjusts the area temperature by adjusting temperatures of the first condenser and the second condenser. The control unit outputs a first PWM signal to control the rotation speed of the condensing fan and decreases the area temperature by increasing a frequency of the first PWM signal.

In one or more than one embodiment, the evaporating fan adjusts the area temperature by adjusting temperatures of the first evaporator and the second evaporator. The control unit outputs a second PWM signal to control the rotation speed of the evaporating fan and decreases the area temperature by decreasing a frequency of the second PWM signal.

In one or more than one embodiment, the air conditioning system further includes a cabinet having a first side and a second side opposite to the first side. A condenser unit includes the first condenser and the second condenser, and the condenser unit and the condensing fan are installed on the first side of the cabinet. An evaporator unit includes the first evaporator and the second evaporator, and the evaporator unit, the evaporating fan, and the control unit are installed on the second side of the cabinet.

In one or more than one embodiment, the condenser unit is installed on one end of the first side of the cabinet and the condensing fan is installed on the other end of the first side of the cabinet. The evaporator unit is installed on one end of the second side of the cabinet, and the evaporating fan is installed on the other end of the second side of the cabinet. The control unit is installed between the evaporating fan and the evaporator unit, and the condensing fan is diagonally opposite to the evaporating fan inside the cabinet.

In one or more than one embodiment, the first pressure regulator and the second pressure regulator are capillaries or expansion valves.

In one or more than one embodiment, the first compressor and the second compressor are invariable frequency compressors.

In one or more than one embodiment, the condensing fan and the evaporating fan are axial-flow fans or diagonal-flow fans, and the DC power source is a 48-volt, 24-volt, or 12-volt voltage source.

In order to solve the problem above, a method of operating an air conditioning system includes steps of: (a) providing a control unit; wherein the control unit is coupled to a compressor unit of a circulation system and a condensing fan of a fan module, and the control unit is configured to receive an AC power source and the condensing fan is configured to receive a DC power source; (b) detecting an area temperature, controlling the compressor unit being in operation or being not in operation according to the area temperature, and controlling a rotation speed of the condensing fan to adjust the area temperature according to the area temperature by the control; (c) controlling the compressor unit being in operation and controlling the condensing fan being in full-speed operation by the control unit when the area temperature is greater than a setting temperature set by the control unit; and (d) controlling the compressor unit being not in operation and controlling the condensing fan being not in operation by the control unit when the area temperature is less than or equal to the setting temperature.

In one or more than one embodiment, the compressor unit includes a first compressor and a second compressor, and the step (c) includes steps of: (c1) controlling the first compressor and the second compressor being not in operation and controlling the condensing fan being in full-speed operation by the control unit when the area temperature is decreased to close to an approach temperature of the setting temperature; and (c2) controlling the first compressor and the second compressor being not in operation and controlling the condensing fan being in slowing-down operation by the control unit when the area temperature is gradually decreased from the approach temperature to the setting temperature.

In one or more than one embodiment, the step (d) includes a step of: (d1) controlling the first compressor being not in operation, controlling the second compressor being in operation, and controlling the condensing fan being in speeding-up operation by the control unit when the area temperature is gradually increased from the setting temperature to the approach temperature.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
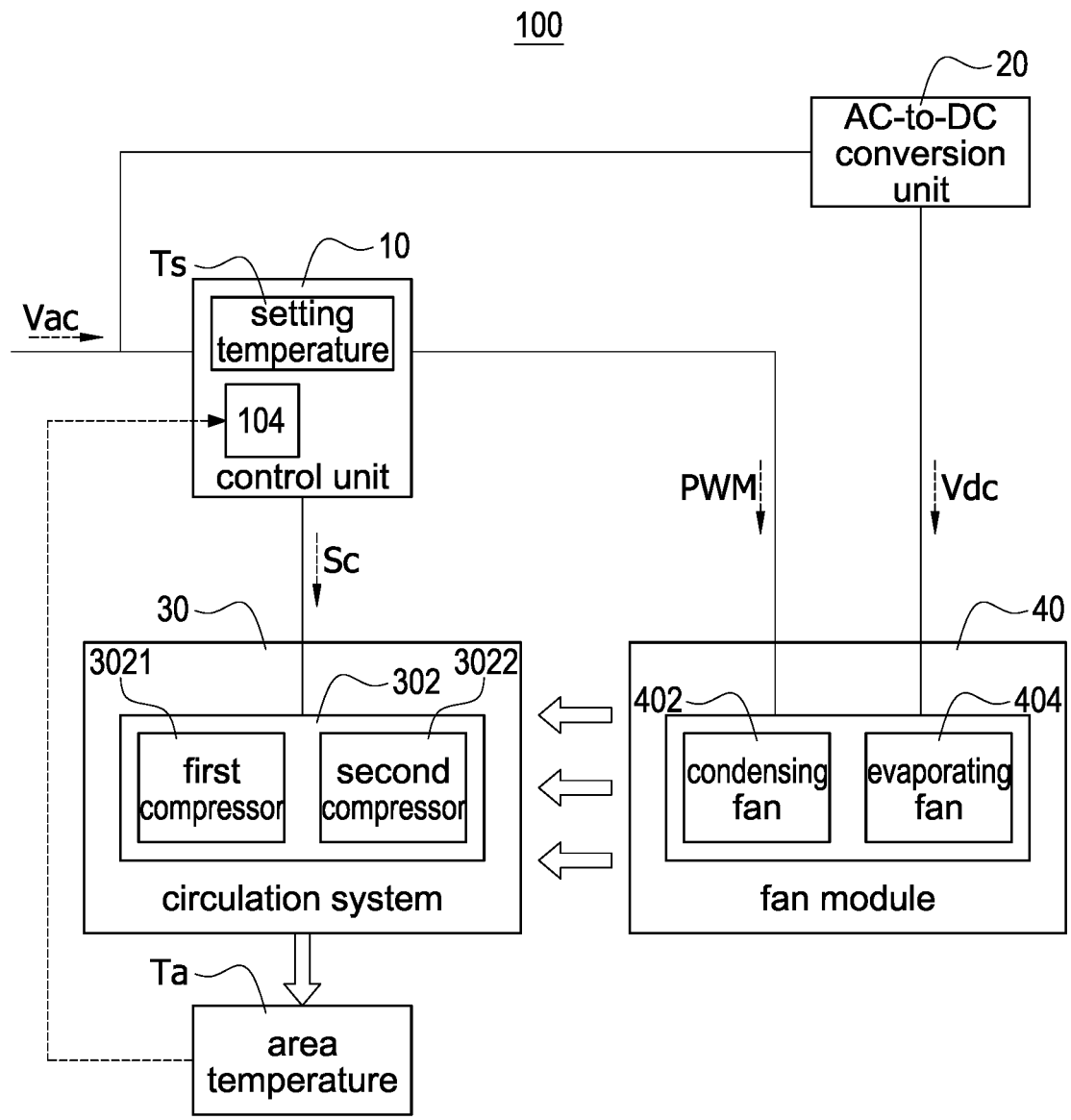
FIG. 1 is a circuit block diagram of an air conditioning system according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a circuit block diagram of an air conditioning system according to the present disclosure. The air conditioning system 100 is provided to detect an area temperature Ta in an area, and adjust the area temperature Ta to a setting temperature Ts set by the air conditioning system 100. The air conditioning system 100 includes a control unit 10, an AC-to-DC conversion unit 20, a circulation system 30, and a fan module 40. The control unit 10 and the AC-to-DC conversion unit 20 are coupled to an AC power source Vac, and the AC-to-DC conversion unit 20 is provided to convert an AC power source Vac into a DC power source Vdc. The circulation system 30 is coupled to the control unit 10, and the control unit 10 outputs a control signal Sc to control the circulation system 30 being in operation or being not in operation. The fan module 40 is coupled to the control unit 10 and the AC-to-DC conversion unit 20, and receives a PWM signal PWM outputted from the control unit 10 and receives the DC power source Vdc outputted from the AC-to-DC conversion unit 20. More specifically, the DC power source Vdc provides the required power for the fan module 40, and the control unit 10 adjusts a rotation speed of the fan module 40 by adjusting a frequency of the PWM signal PWM. The control unit 10 adjusts the air volume provided from the condensing fan 402 toward the circulation system 30 by adjusting the rotation speed of the fan module 40, thereby adjusting a temperature of the circulation system 30. The air conditioning system 100 adjusts the area temperature Ta to the setting temperature Ts by controlling the circulation system 30 being in operation or being not in operation and controlling the rotation speed of the fan module 40 by the control unit 10. The control unit 10 includes a temperature sensor 104, which is used to detect the area temperature Ta of the area, so that the control unit 10 performs subsequent system control according to the area temperature Ta. The temperature sensor 104 is a device well known to those skilled in the art to sense temperature.

The circulation system 30 includes a compressor unit 302 having a first compressor 3021 and a second compressor 3022. The control unit 10 is coupled to the first compressor 3021 and the second compressor 3022, and the control unit 10 outputs the control signal Sc to control the first compressor 3021 and the second compressor 3022 being in operation or being not in operation according to a temperature difference between the area temperature Ta and the setting temperature Ts. The fan module 40 includes a condensing fan 402 and an evaporating fan 404, and the condensing fan 402 and the evaporating fan 404 are coupled to the control unit 10 and the AC-to-DC conversion unit 20. The DC power source Vdc provides the required power to the condensing fan 402 and the evaporating fan 404 for being in operation. Also, the control unit 10 adjusts the air volume provided from the condensing fan 402 and the evaporating fan 404 toward the circulation system 30 by adjusting the frequency of the PWM signal PWM to adjust the rotation speed of the condensing fan 402 and that of the evaporating fan 404. In particular, both the condensing fan 402 and the evaporating fan 404 are DC fans, also the condensing fan 402 and the evaporating fan 404 are axial-flow fans or diagonal-flow fans, and the DC power source Vdc is a 48-volt, 24-volt, or 12-volt voltage source.

Figure 2:
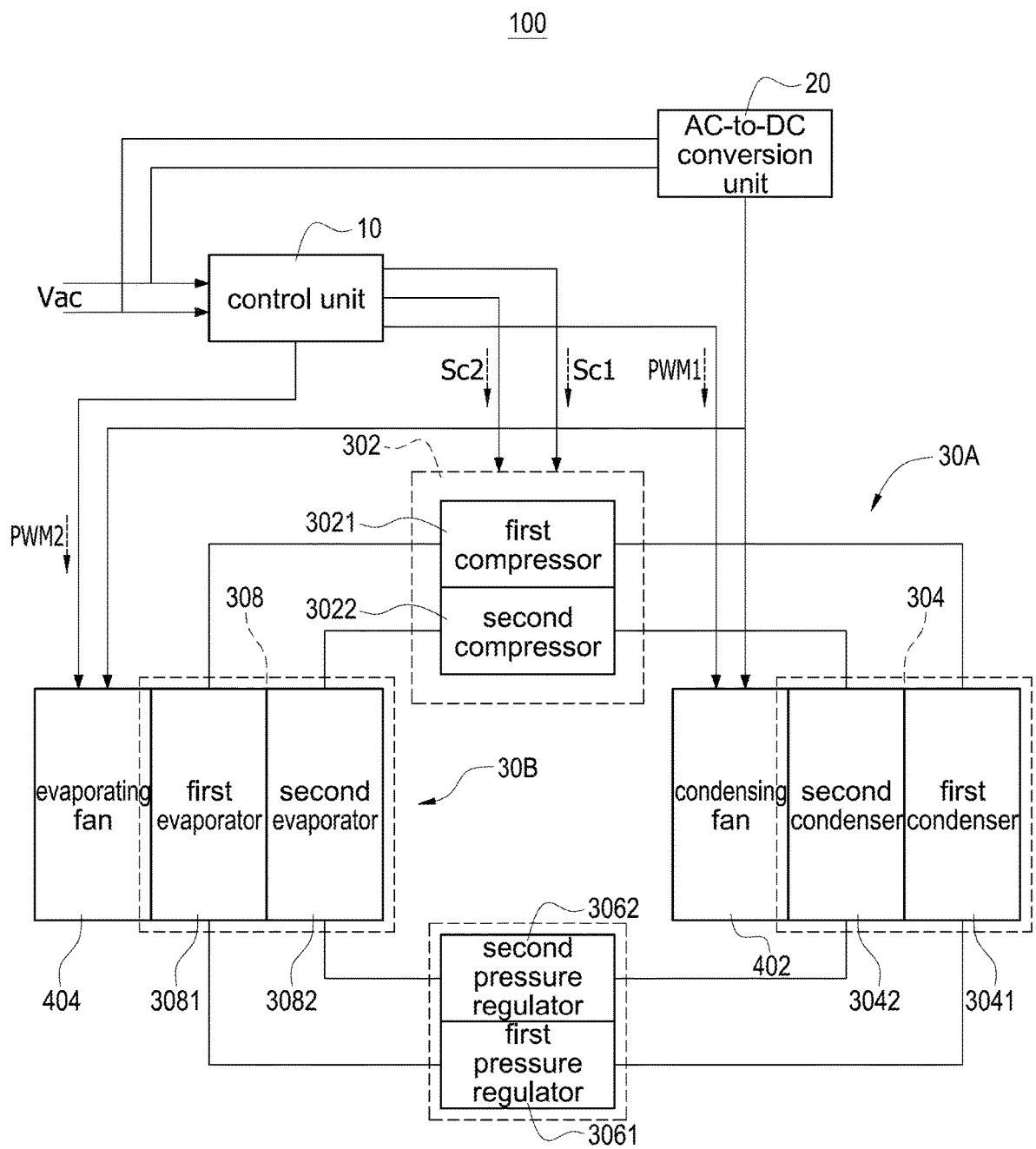
FIG. 2 is a detailed circuit block diagram of the air conditioning system according to the present disclosure.

Please refer to FIG. 2, which shows a detailed circuit block diagram of the air conditioning system according to the present disclosure, and also refer to FIG. 1. The control unit 10 receives the AC power source Vac and outputs the control signal Sc and the PWM signal PWM to control the compressor unit 302 and the fan module 40, respectively. The control signal Sc involves a first control signal Sc1 and a second control signal Sc2. The first control signal Sc1 is provided to control the first compressor 3021 being in operation or being not in operation. The second control signal Sc2 is provided to control the second compressor 3022 being in operation or being not in operation. The PWM signal PWM involves a first PWM signal PWM1 and a second PWM signal PWM2. The first PWM signal PWM1 is provided to control the rotation speed of the condensing fan 402 and the second PWM signal PWM2 is provided to control the rotation speed of the evaporating fan 404.

The circulation system 30 includes a first circulation module 30A and a second circulation module 30B. The first compressor 3021 controls the first circulation module 30A to operation a refrigerant circulation, and the second compressor 3022 controls the second circulation module 30B to operation a refrigerant circulation. The first circulation module 30A includes the first compressor 3021, a first condenser 3041, a first pressure regulator 3061, and a first evaporator 3081. The first condenser 3041 is coupled to one side of the first compressor 3021 and one side of the first pressure regulator 3061; the first evaporator 3081 is coupled to the other side of the first compressor 3021 and the other side of the first pressure regulator 3061. The second circulation module 30B includes the second compressor 3022, a second condenser 3042, a second pressure regulator 3062, and a second evaporator 3082. The second condenser 3042 is coupled to one side of the second compressor 3022 and one side of the second pressure regulator 3062; the second evaporator 3082 is coupled to the other side of the second compressor 3022 and the other side of the second pressure regulator 3062. In some embodiments, the first pressure regulator 3061 and the second pressure regulator 3062 are capillaries or expansion valves.

The condensing fan 402 is disposed at the same side of the first condenser 3041 and the second condenser 3042. The condensing fan 402 provides the air with an external ambient temperature toward the first condenser 3041 and the second condenser 3042, thereby adjusting the temperatures of the first condenser 3041 and the second condenser 3042. Therefore, the condensing fan 402 provides the first PWM signal PWM1 to control the rotation speed of the condensing fan 402. When the area temperature Ta is higher, such as higher than the setting temperature Ts, the control unit 10 increases the frequency of the first PWM signal PWM1 to increase the air volume provided from the condensing fan 402, thereby decreasing the area temperature Ta. The evaporating fan 404 is disposed at the same side of the first evaporator 3081 and the second evaporator 3082. The evaporating fan 404 provides the air with a high temperature inside the air conditioning system 100 toward the first evaporator 3081 and the second evaporator 3082, thereby adjusting the temperatures of the first evaporator 3081 and the second evaporator 3082. Therefore, the evaporating fan 404 provides the second PWM signal PWM2 to control the rotation speed of the evaporating fan 404. When the area temperature Ta is higher, such as higher than the setting temperature Ts, the control unit 10 decreases the frequency of the second PWM signal PWM2 to decrease the air volume provided from the evaporating fan 404, thereby decreasing the area temperature Ta.

More specifically, when the first compressor 3021 and the second compressor 3022 are in operation, the first compressor 3021 and the second compressor 3022 compress the high-temperature refrigerants thereof and provide the compressed high-temperature refrigerants to the first condenser 3041 and the second condenser 3042. At this condition, the air conditioning system 100 provides the air with the external ambient temperature toward the first condenser 3041 and the second condenser 3042 by the condensing fan 402, thereby removing the heat generated from the high-temperature refrigerants inside the first condenser 3041 and the second condenser 3042 so that the refrigerants inside the first condenser 3041 and the second condenser 3042 are cooled to become liquid. Afterward, the first pressure regulator 3061 and the second pressure regulator 3062 decompress the liquid refrigerants to become low-temperature. Afterward, the low-temperature liquid refrigerants flow to the first evaporator 3081 and the second evaporator 3082. At this condition, the evaporating fan 404 provides the high-temperature air inside the air conditioning system 100 toward the first evaporator 3081 and the second evaporator 3082, thereby decreasing the temperature inside the air conditioning system 100 to cool devices inside the air conditioning system 100. The first evaporator 3081 and the second evaporator 3082 absorb high-temperature heat to vapor the refrigerants so that the vapor refrigerants flow back to the first compressor 3021 and the second compressor 3022.

In one embodiment, the first compressor 3021 and the second compressor 3022 may be invariable frequency compressors. In some embodiments, the invariable frequency compressor is coordinated with the speed-adjustable condensing fan 402 to accurately control the temperature of the circulation system 30, and therefore to precisely control the area temperature Ta. Accordingly, the circulation system 30 using the invariable frequency compressors can achieve the similar control effect of the air conditioning system using variable frequency compressors, thereby saving the equipment costs of the air conditioning system.

Figure 3:
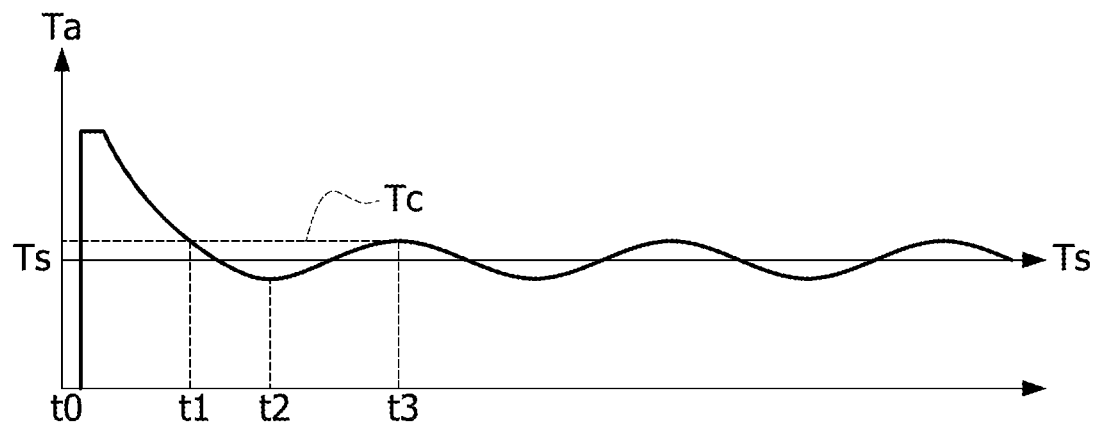
FIG. 3 is a schematic waveform of a temperature control for the air conditioning system according to the present disclosure.

Please refer to FIG. 3, which shows a schematic waveform of a temperature control for the air conditioning system according to the present disclosure, and also refer to FIG. 1 and FIG. 2. The user controls the control unit 10 to set the setting temperature Ts. At this time, the control unit 10 detects the area temperature Ta and controls the compressor unit 302, the condensing fan 402, and the evaporating fan 404 according to a temperature difference between the area temperature Ta and the setting temperature Ts. When the area temperature Ta is greater than the setting temperature Ts set by the control unit 10 at time t0 to time t1, the control unit 10 outputs the control signal Sc to control the compressor unit 302 being in operation and outputs the first PWM signal PWM1 to control the condensing fan 402 being in full-speed operation. At this condition, the area temperature Ta is gradually decreased to approach the setting temperature Ts. When the area temperature Ta is decreased to the approach temperature Tc close to the setting temperature Ts at time t1, the control unit 10 outputs the first control signal Sc1 to control the first compressor 3021 being in operation, outputs the second control signal Sc2 to control the second compressor 3022 being not in operation, and outputs the first PWM signal PWM1 to control the condensing fan 402 being in full-speed operation. At this condition, the area temperature Ta would be continuously decreased but slowly. When the area temperature Ta is gradually decreased from the approach temperature Tc to the setting temperature Ts or less than the setting temperature Ts at time t1 to time t2, the control unit 10 controls the first compressor 3021 being still in operation and the second compressor 3022 being still not in operation. Also, the control unit 10 gradually decreases the frequency of the first PWM signal PWM1 to gradually slow down the rotation speed of the condensing fan 402, such as from 100% (full-speed operation) to 0% (stationary state). At this condition, the heat dissipation effects of the first condenser 3041 and the second condenser 3042 would be deteriorated and the area temperature Ta would be gradually decreased to less than or equal to the setting temperature Ts. In some embodiments, the approach temperature Tc is preferably larger than the setting temperature Ts in three degrees, but not limited. Further, the preferred temperature difference between the approach temperature Tc and the setting temperature Ts may be set and adjusted by the user according to the actual situations.

When the area temperature Ta is less than or equal to the setting temperature Ts such as at time t2, the control unit 10 outputs the control signal Sc to control the compressor unit 302 being not in operation and outputs the first PWM signal PWM1 to control the condensing fan 402 being not in operation. At this condition, the temperatures of the first condenser 3041 and the second condenser 3042 and the area temperature Ta are gradually increased. When the area temperature Ta is gradually increased from the setting temperature Ts to the approach temperature Tc at time t2 to time t3, the control unit 10 outputs the first control signal Sc1 to control the first compressor 3021 being not in operation and outputs the second control signal Sc2 to control the second compressor 3022 being in operation. Also, the control unit 10 gradually increases the frequency of the first PWM signal PWM1 to gradually speed up the rotation speed of the condensing fan 402, such as from 0% (stationary state) to 100% (full-speed operation). At this condition, when the setting temperature Ts is gradually increased to the approach temperature Tc but the area temperature Ta fails to be maintained below the approach temperature Tc, the control unit 10 outputs the control signal Sc to activate the another compressor which is not in operation, namely the first compressor 3021 to achieve the maximum cooling capacity by the first compressor 3021 and the second compressor 3022. As shown in FIG. 3, the area temperature Ta is controlled to decrease to the setting temperature Ts and maintained within a temperature range, such as between the approach temperature Tc and the setting temperature Ts in this embodiment by adjusting the rotation speed of the condensing fan 402 by the first PWM signal PWM1. Accordingly, the area temperature Ta can be accurately and stably controlled without frequently controlling the operation states of the compressor unit 302.

In some embodiments, the air conditioning system 100 further includes more than two circulation modules (not limited to the first circulation module 30A and the second circulation module 30B), and the system structure and the control manners can be applied to the air conditioning system 100 with more than two circulation modules. The control unit 10 may control the circulation modules by turns. For example, it is assumed that three circulation modules are provided in the air conditioning system 100, and each circulation module has a compressor. When the area temperature Ta is gradually decreased from the approach temperature Tc to the setting temperature Ts, the control unit 10 controls one or two circulation modules being in operation. Also, when the area temperature Ta is gradually increased from the setting temperature Ts to the approach temperature Tc, the control unit 10 controls the other two circulation modules or the other one circulation module being in operation.

Figure 4:
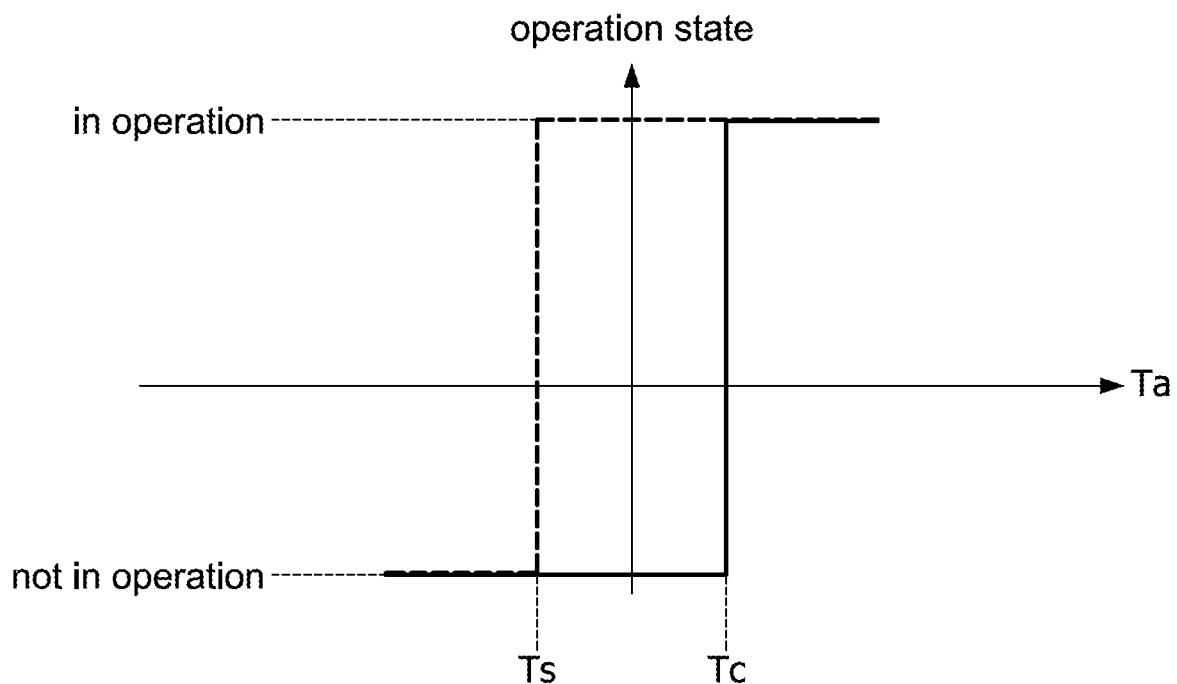
FIG. 4 is a schematic view of an operation state of a compressor unit according to the present disclosure.

Please refer to FIG. 4, which shows a schematic view of an operation state of a compressor unit according to the present disclosure, and also refer to FIG. 1 to FIG. 3. As shown in FIG. 4, the horizontal axis represents the area temperature Ta; the vertical axis represents the state of the compressor unit 302. When the area temperature Ta is greater than the approach temperature Tc, the first compressor 3021 and the second compressor 3022 are in operation. When the area temperature Ta is decreased from over the approach temperature Tc to between the approach temperature Tc and the setting temperature Ts, the first compressor 3021 is in operation but the second compressor 3022 is not in operation. When the area temperature Ta is less than or equal to the setting temperature Ts, the first compressor 3021 and the second compressor 3022 are not in operation. When the area temperature Ta is increased from under the setting temperature Ts to between the approach temperature Tc and the setting temperature Ts, the first compressor 3021 is not in operation but the second compressor 3022 is in operation. As shown in FIG. 4, a hysteretic control manner is used for controlling the compressor unit 302, including the first compressor 3021 and the second compressor 3022 by the control unit 10, thereby significantly extending the operation life of the compressor unit 302 and accurately controlling the area temperature Ta. Also, only the middle-scale or small-scale compressors may be used for a large air conditioning system without large-scale compressors, and therefore to achieve the same air conditioning capacity and save electricity consumption.

Figure 5:
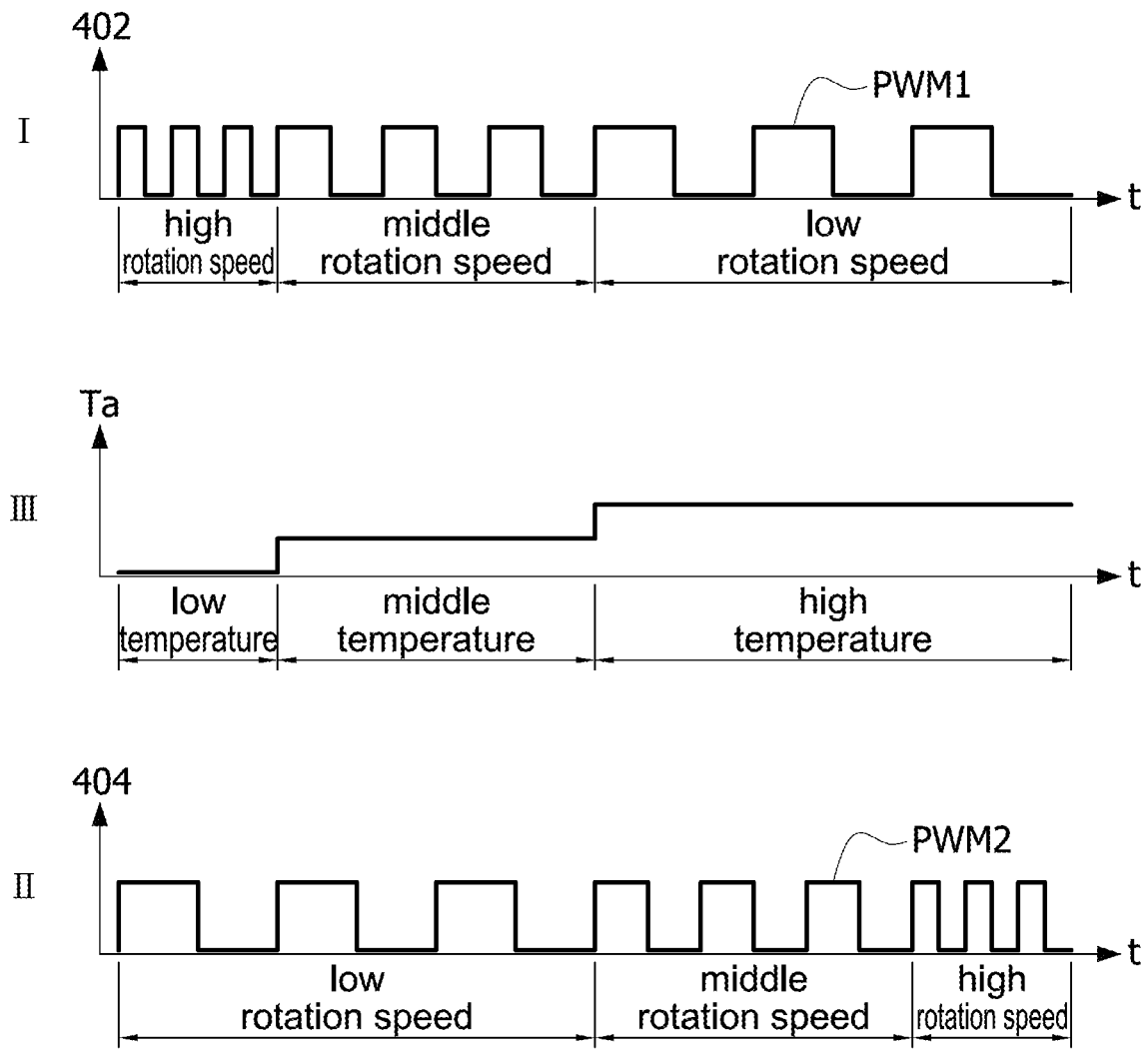
FIG. 5 is a schematic view of an outlet temperature of the air conditioning system according to the present disclosure.

Please refer to FIG. 5, which shows a schematic view of an outlet temperature of the air conditioning system according to the present disclosure, and also refer to FIG. 1 to FIG. 4. As shown in a waveform I, an outlet temperature of the air conditioning system 100 may be adjusted by controlling the rotation speed of the condensing fan 402 by the first PWM signal PWM1 outputted from the control unit 10. When the frequency of the first PWM signal PWM1 is higher and the rotation speed of the condensing fan 402 is faster, such as 70% to 100%, the first condenser 3041 and the second condenser 3042 provide better dissipate heat and therefore the refrigerants inside thereof are low-temperature. At this condition, the outlet temperature of the air conditioning system 100 is lower shown in a waveform III since the temperatures of internal circulations of the first evaporator 3081 and the second evaporator 3082 are decreased. When the frequency of the first PWM signal PWM1 is lower and the rotation speed of the condensing fan 402 is slower, such as 0% to 30%, the first condenser 3041 and the second condenser 3042 provide poor dissipate heat and therefore the refrigerants inside thereof are high-temperature. At this condition, the outlet temperature of the air conditioning system 100 is higher shown in the waveform III.

Alternatively, the outlet temperature of the air conditioning system 100 may be adjusted by controlling the rotation speed of the evaporating fan 404 by the second PWM signal PWM2 outputted from the control unit 10. When the frequency of the second PWM signal PWM2 is lower and the rotation speed of the evaporating fan 404 is slower, such as 0% to 30%, the first evaporator 3081 and the second evaporator 3082 provide the air with low-temperature. At this condition, the outlet temperature of the air conditioning system 100 is lower shown in a waveform III. When the frequency of the second PWM signal PWM2 is higher and the rotation speed of the evaporating fan 404 is higher, such as 70% to 100%, the first evaporator 3081 and the second evaporator 3082 provide the air with high-temperature. At this condition, the outlet temperature of the air conditioning system 100 is higher shown in the waveform III. Accordingly, the temperatures of internal circulations of the fan module 40 can be controlled without frequently controlling the operation states of the compressor unit 302.

Figure 6A:
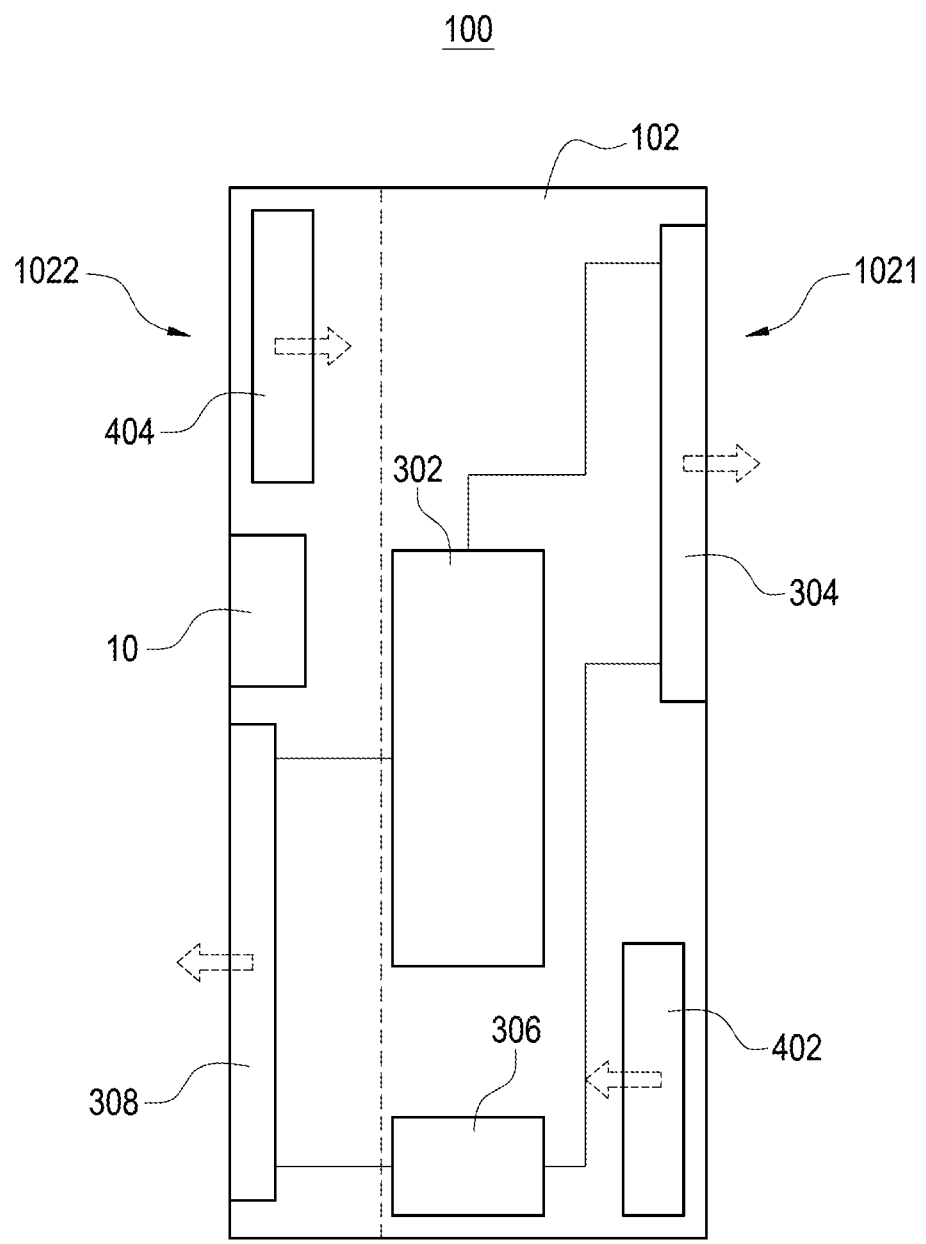
FIG. 6A is a schematic structural view of the air conditioning system according to the present disclosure.

Please refer to FIG. 6A, which shows a schematic structural view of the air conditioning system according to the present disclosure, and also refer to FIG. 1 to FIG. 5. The air conditioning system 100 includes a cabinet 102 having a first side 1021 and a second side 1022. The pressure regulation module 306 includes the first pressure regulator 3061 and the second pressure regulator 3062. The pressure regulation module 306 and the compressor unit 302 are contained inside the cabinet 102. The condenser unit 304 includes a first condenser 3041 and a second condenser 3042. The condenser unit 304 and the condensing fan 402 are installed on the first side 1021 of the cabinet 102. The evaporator unit 308 includes the first evaporator 3081 and the second evaporator 3082. The evaporator unit 308, the evaporating fan 404, and the control unit 10 are contained inside the cabinet 102 and installed on the second side 1022 of the cabinet 102.

Figure 6B:
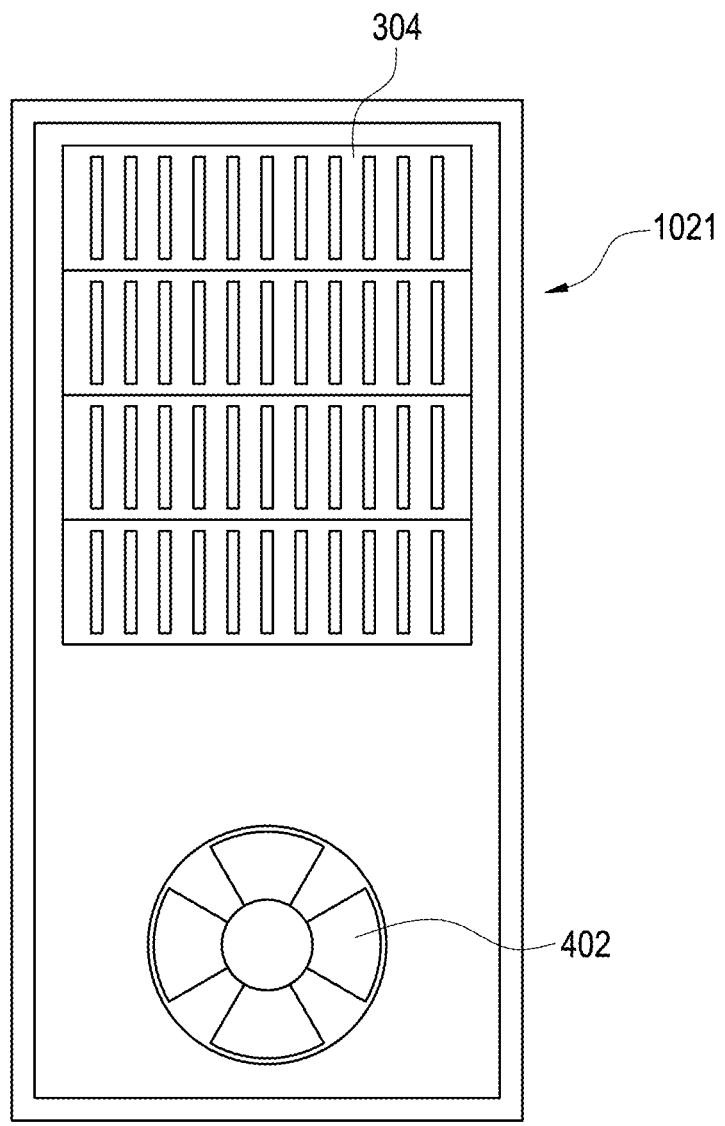
FIG. 6B is a schematic view of a first side of a cabinet of the air conditioning system according to the present disclosure.
Figure 6C:
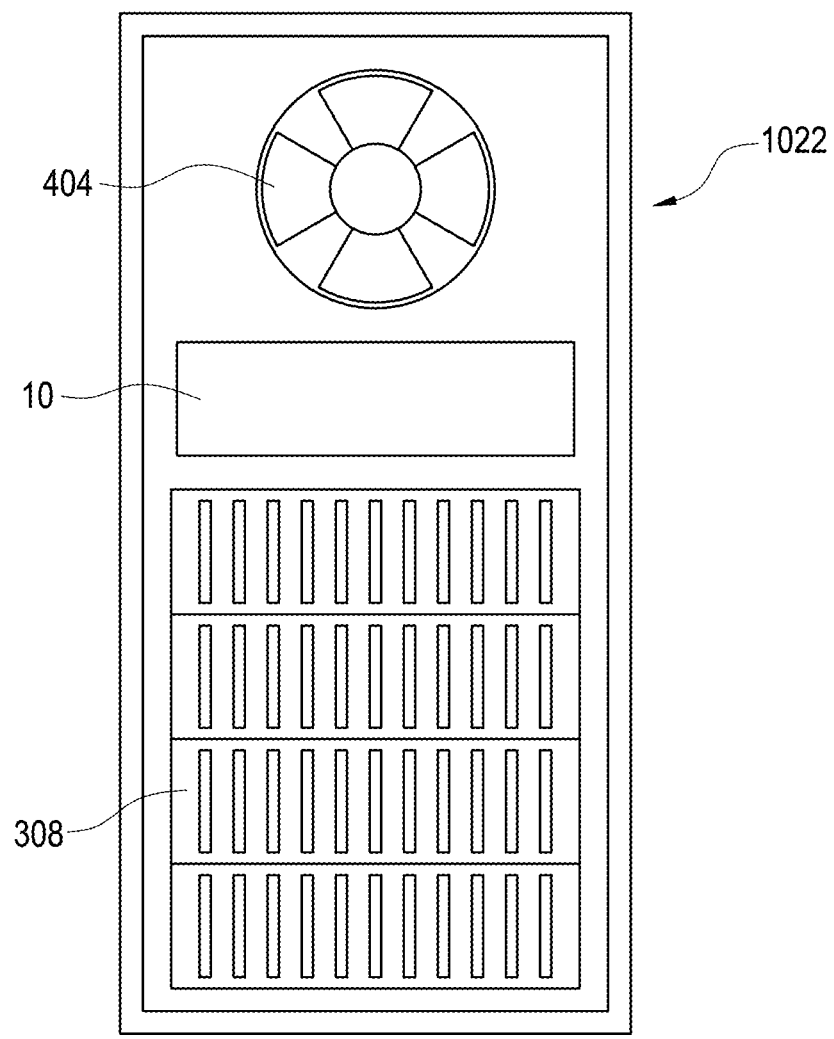
FIG. 6C is a schematic view of a second side of the cabinet of the air conditioning system according to the present disclosure.

Please refer to FIG. 6B, which shows a schematic view of a first side of a cabinet of the air conditioning system according to the present disclosure, and also refer to FIG. 1 to FIG. 6A. The condenser unit 304 is installed on one end of the first side 1021 and the condensing fan 402 is installed on the other end of the first side 1021. Please refer to FIG. 6C, which shows a schematic view of a second side of the cabinet of the air conditioning system according to the present disclosure, and also refer to FIG. 1 to FIG. 6B. The evaporator unit 308 is installed on one end of the second side 1022 and the evaporating fan 404 is installed on the other end of the second side 1022. Also refer to FIG. 6A to FIG. 6AC, the control unit 10 is installed between the evaporating fan 404 and the evaporator unit 308, and the condensing fan 402 is diagonally opposite to the evaporating fan 404, namely diagonal ends of the two sides of the cabinet 102 as shown in FIG. 6A. The pressure regulation module 306 and the compressor unit 302 are respectively coupled between the condenser unit 304 and the evaporator unit 308, and the pressure regulation module 306 is close to the condensing fan 402. Moreover, the air flow generated from the condensing fan 402 and the evaporating fan 404 does not interact with each other when the air conditioning system 100 works, thereby accurately controlling the area temperature Ta in accordance with the structural designs in FIG. 6A to FIG. 6C.

Figure 7:
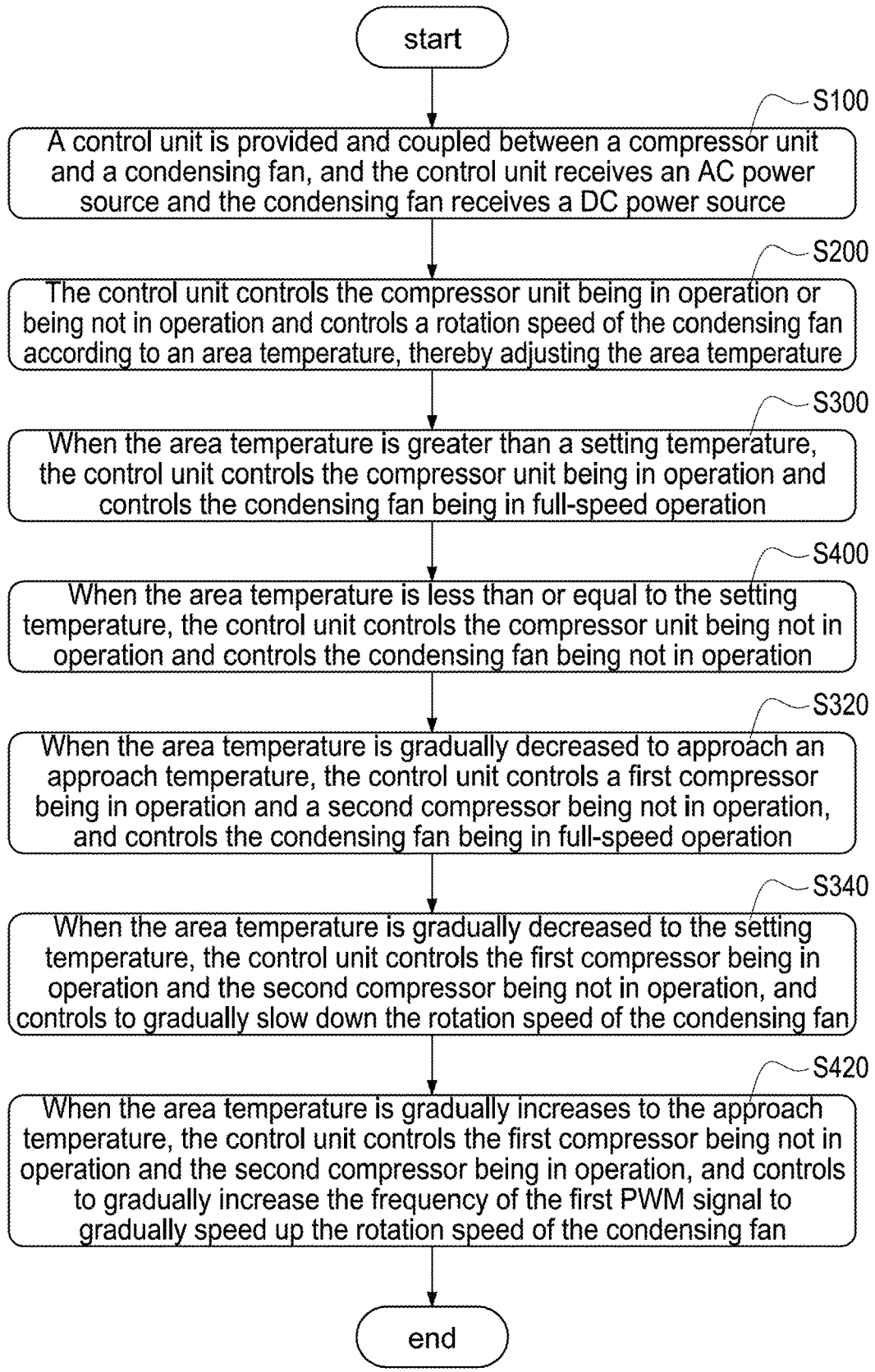
FIG. 7 is a flowchart of a method of operating the air conditioning system according the present disclosure.

Please refer to FIG. 7, which shows a flowchart of a method of operating the air conditioning system according to the present disclosure, and also refer to FIG. 1 to FIG. 6. The method includes steps as follows. First, a control unit 10 is provided and the control unit 10 is coupled between a compressor unit 302 and a condensing fan 402. The control unit 10 receives an AC power source Vac and the condensing fan 402 receives a DC power source Vdc (S100). The control unit 10 is used to control the compressor unit 302 and the condensing fan 402. Afterward, the control unit 10 controls the compressor unit 302 being in operation or being not in operation and controls the rotation speed of the condensing fan 402 according to an area temperature Ta, thereby adjusting the area temperature Ta (S200). The control unit 10 outputs a control signal Sc to control the compressor unit 302 being in operation or being not in operation. Also, the control unit 10 outputs a first PWM signal PWM1 to control the rotation speed of the condensing fan 402 for controlling a temperature of a circulation system 30 and adjusting the area temperature Ta.

Afterward, when the area temperature Ta is greater than a setting temperature Ts, the control unit 10 controls the compressor unit 302 being in operation and controls the condensing fan 402 being in full-speed operation (S300). The control unit 10 detects the area temperature Ta and controls the compressor unit 302 and the condensing fan 402 according to a temperature difference between the area temperature Ta and the setting temperature Ts set by the control unit 10. When the area temperature Ta is larger than the setting temperature Ts, the control unit 10 outputs the control signal Sc to control the compressor unit 302 being in operation and outputs the first PWM signal PWM1 to control the condensing fan 402 being in full-speed operation. At this condition, the area temperature Ta is gradually decreased to approach the setting temperature Ts. Finally, when the area temperature Ta is less than or equal to the setting temperature Ts, the control unit 10 controls the compressor unit 302 being not in operation and controls the condensing fan 402 being not in operation (S400). When the area temperature Ta is less than or equal to the setting temperature Ts, the control unit 10 outputs the control signal Sc to control the compressor unit 302 being not in operation and outputs the first PWM signal PWM1 to control the condensing fan 402 being not in operation. At this condition, the temperatures of a first condenser 3041 and a second condenser 3042 of the condenser unit 304 and the area temperature Ta are gradually increased.

In step (S300), when the area temperature Ta is gradually decreased to approach an approach temperature Tc, the control unit 10 controls a first compressor 3021 being in operation and a second compressor 3022 being not in operation, and controls the condensing fan 402 being in full-speed operation (S320). When the area temperature Ta is decreased to the approach temperature Tc close to the setting temperature Ts, the control unit 10 outputs a first control signal Sc1 to control the first compressor 3021 being in operation, outputs a second control signal Sc2 to control the second compressor 3022 being not in operation, and outputs the first PWM signal PWM1 to control the condensing fan 402 being in full-speed operation. At this condition, the area temperature Ta would be continuously decreased but slowly. Finally, when the area temperature Ta is gradually decreased to the setting temperature Ts, the control unit 10 controls the first compressor 3021 being in operation and the second compressor 3022 being not in operation, and controls to gradually slow down the rotation speed of the condensing fan 402 (S340). When the area temperature Ta is gradually decreased from the approach temperature Tc to the setting temperature Ts, the control unit 10 controls the first compressor 3021 being still in operation and the second compressor 3022 being still not in operation. Also, the control unit 10 gradually decreases the frequency of the first PWM signal PWM1 to gradually slow down the rotation speed of the condensing fan 402, such as from 100% (full-speed operation) to 0% (stationary state). At this condition, the heat dissipation effects of the first condenser 3041 and the second condenser 3042 would be gradually deteriorated and the area temperature Ta would be gradually decreased to less than or equal to the setting temperature Ts.

In step (S400), when the area temperature Ta is gradually increases to the approach temperature Tc, the control unit 10 controls the first compressor 3021 being not in operation and the second compressor 3022 being in operation, and controls to gradually increase the frequency of the first PWM signal PWM1 to gradually speed up the rotation speed of the condensing fan 402 (S420). When the area temperature Ta is gradually increased from the setting temperature Ts to the approach temperature Tc, the control unit 10 outputs the first control signal Sc1 to control the first compressor 3021 being not in operation and outputs the second control signal Sc2 to control the second compressor 3022 being in operation. Also, the control unit 10 gradually increases the frequency of the first PWM signal PWM1 to gradually speed up the rotation speed of the condensing fan 402, such as from 0% (stationary state) to 100% (full-speed operation).

In conclusion, the present disclosure has following features and advantages:

1. The invariable frequency compressor is coordinated with the speed-adjustable condensing fan to accurately control the temperature of the circulation system, thereby precisely controlling the area temperature and saving the equipment costs of the air conditioning system.

2. The area temperature is controlled to decrease to the setting temperature and maintained within a temperature range by adjusting the rotation speed of the condensing fan by the first PWM signal, thereby controlling the temperatures of internal circulations of the fan module and accurately and stably controlling the area temperature without frequently controlling the operation states of the compressor unit.

3. The hysteretic control manner is used for controlling the different compressors by turns, thereby significantly extending the operation life of the compressors.

4. Only the middle-scale or small-scale compressors may be used for a large air conditioning system without large-scale compressors, thereby achieving the same air conditioning capacity.

5. Only a single compressor is in operation when the area temperature is between the approach temperature and the setting temperature and only the fan module is in operation when the area temperature is equal to the setting temperature, thereby saving electricity consumption.

6. The air flow generated from the condensing fan and the evaporating fan does not interact with each other since the condensing fan is diagonally opposite to the evaporating fan inside the cabinet, thereby accurately controlling the area temperature.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An air conditioning system comprising:
a control unit coupled to an AC power source, the control unit including a temperature detecting device;
a circulation system comprising a compressor unit, and the compressor unit comprising a first compressor and a second compressor; wherein the first compressor and the second compressor are coupled to the control unit;
an AC-to-DC conversion unit configured to convert the AC power source into a DC power source; and
a fan module comprising a condensing fan, and the condensing fan coupled to the control unit and the AC-to-DC conversion unit and the condensing fan configured to receive the DC power source;
wherein the temperature detecting device of the control unit is configured to detect an area temperature of an area detected by the air conditioning system, control the compressor unit being in operation or not in operation according to the area temperature and a setting temperature set by the control unit, and control a rotation speed of the condensing fan according to a temperature difference between the area temperature and the setting temperature; when the area temperature is greater than the setting temperature, the control unit is configured to control the compressor unit being in operation and control the condensing fan being in full-speed operation;
wherein the control unit uses a hysteresis control method to control the compressor unit, the hysteresis control method is that when the area temperature is decreased to close to an approach temperature of the setting temperature, the control unit is configured to control the first compressor being in operation, control the second compressor being not in operation, and control the condensing fan being in full-speed operation; and that when the area temperature is gradually decreased from the approach temperature to the setting temperature, the control unit is configured to control the first compressor being in operation, control the second compressor being not in operation, and control to gradually slow down the rotation speed of the condensing fan; when the area temperature is gradually increased to the approach temperature, the control unit is configured to control the first compressor being not in operation, control the second compressor being in operation, and control to gradually speed up the rotation speed of the condensing fan.

2. The air conditioning system in claim 1, wherein when the area temperature is less than or equal to the setting temperature, the control unit is configured to control the compressor unit being not in operation and control the condensing fan being not in operation.

3. The air conditioning system in claim 1, further comprising:
- a first circulation module coupled to the first compressor, and the first circulation module comprising:
- a first pressure regulator;
- a first condenser coupled to the first compressor and one side of the first pressure regulator; and
- a first evaporator coupled to the first compressor and the other side of the first pressure regulator; and
- a second circulation module coupled to the second compressor, and the second circulation module comprising:
- a second pressure regulator;
- a second condenser coupled to the second compressor and one side of the second pressure regulator; and
- a second evaporator coupled to the second compressor and the other side of the second pressure regulator;
- wherein the fan module further comprises an evaporating fan; the condensing fan is disposed at the same side of the first condenser and the second condenser, and the evaporating fan is disposed at the same side of the first evaporator and the second evaporator.

4. The air conditioning system in claim 3, wherein the control unit is configured to control the first compressor and the second compressor being in operation or being not in operation according to the area temperature so as to control the first circulation module and the second circulation module to operate or not to operate a refrigerant circulation.

5. The air conditioning system in claim 3, wherein the condensing fan is configured to adjust the area temperature by adjusting temperatures of the first condenser and the second condenser; the control unit is configured to output a first pulse width modulation signal to control the rotation speed of the condensing fan and decrease the area temperature by increasing a frequency of the first pulse width modulation signal.

6. The air conditioning system in claim 3, wherein the evaporating fan is configured to adjust the area temperature by adjusting temperatures of the first evaporator and the second evaporator; the control unit is configured to output a second pulse width modulation signal to control the rotation speed of the evaporating fan and decrease the area temperature by decreasing a frequency of the second pulse width modulation signal.

7. The air conditioning system in claim 3, further comprising:
- a cabinet having a first side and a second side opposite to the first side;
- wherein a condenser unit comprises the first condenser and the second condenser, and the condenser unit and the condensing fan are installed on the first side of the cabinet;
- wherein an evaporator unit comprises the first evaporator and the second evaporator, and the evaporator unit, the evaporating fan, and the control unit are installed on the second side of the cabinet.

8. The air conditioning system in claim 7, wherein the condenser unit is installed on one end of the first side of the cabinet and the condensing fan is installed on the other end of the first side of the cabinet; the evaporator unit is installed on one end of the second side of the cabinet, and the evaporating fan is installed on the other end of the second side of the cabinet; the control unit is installed between the evaporating fan and the evaporator unit, and the condensing fan is diagonally opposite to the evaporating fan inside the cabinet.

9. The air conditioning system in claim 3, wherein the first pressure regulator and the second pressure regulator are capillaries or expansion valves.

10. The air conditioning system in claim 1, wherein the first compressor and the second compressor are invariable frequency compressors.

11. The air conditioning system in claim 3, wherein the condensing fan and the evaporating fan are axial-flow fans or diagonal-flow fans, and the DC power source is a 48-volt, 24-volt, or 12-volt voltage source.

12. A method of operating an air conditioning system, the method comprising steps of:
- (a) providing a control unit; wherein the control unit is coupled to a compressor unit of a circulation system and a condensing fan of a fan module, and the control unit is configured to receive an AC power source and the condensing fan is configured to receive a DC power source;
- (b) detecting an area temperature of an area detected by the air conditioning system by a temperature detecting device of the control unit, controlling the compressor unit being in operation or being not in operation according to the area temperature, and controlling a rotation speed of the condensing fan to adjust the area temperature according to the area temperature by the control;
- (c) controlling the compressor unit being in operation and controlling the condensing fan being in full-speed operation by the control unit when the area temperature is greater than a setting temperature set by the control unit; wherein the compressor unit comprises a first compressor and a second compressor, and the step (c) comprises steps of:
- (c1) controlling the first compressor and the second compressor being not in operation and controlling the condensing fan being in full-speed operation by the control unit when the area temperature is decreased to close to an approach temperature of the setting temperature; and
- (c2) controlling the first compressor and the second compressor being not in operation and controlling the condensing fan being in slowing-down operation by the control unit when the area temperature is gradually decreased from the approach temperature to the setting temperature;
- (d) controlling the compressor unit being not in operation and controlling the condensing fan being not in operation by the control unit when the area temperature is less than or equal to the setting temperature; wherein the step (d) comprises a step of:
- (d1) controlling the first compressor being not in operation, controlling the second compressor being in operation, and controlling the condensing fan being in speeding-up operation by the control unit when the area temperature is gradually increased from the setting temperature to the approach temperature.

* * * * *